Jan. 6, 1925.
E. P. CAMPBELL
1,521,751
CONNECTING ROD CENTERING AND HOLDING DEVICE
Filed Feb. 9, 1923
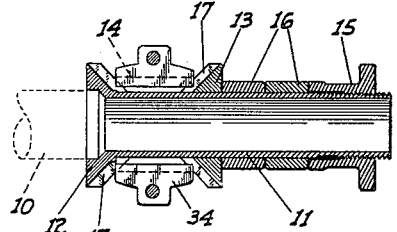
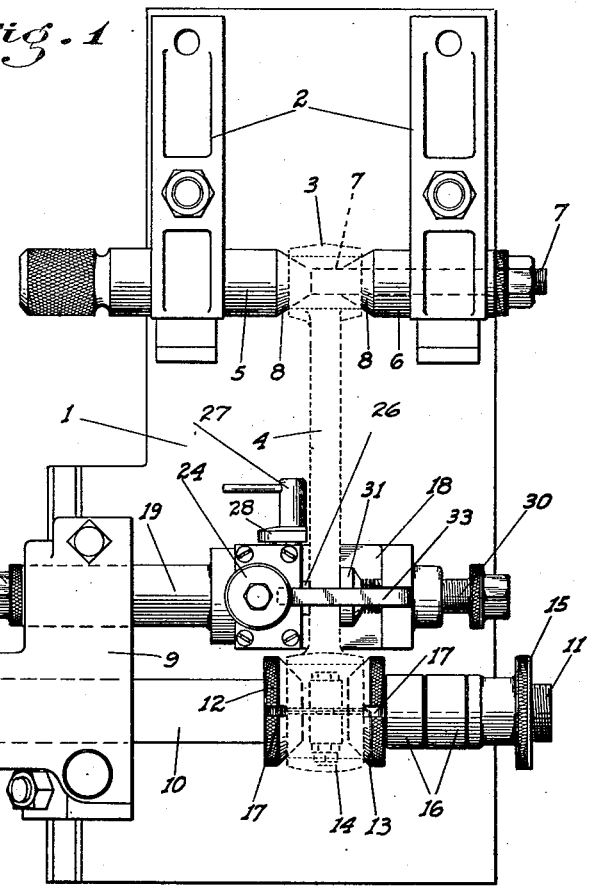
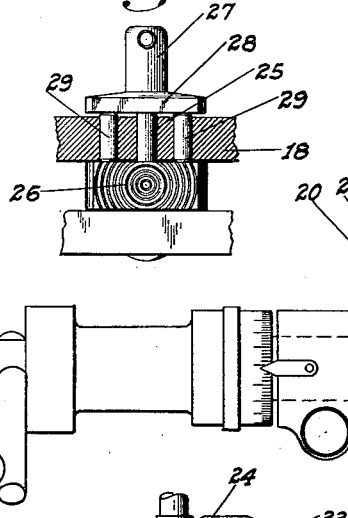
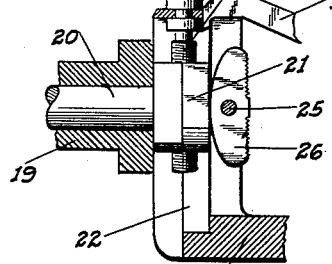
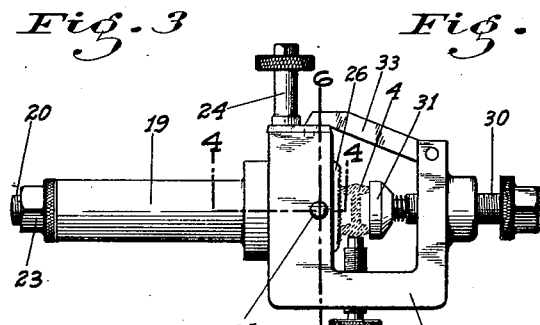
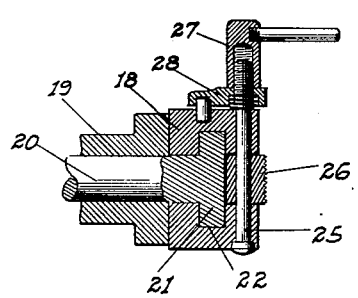
INVENTOR.
Ernest P. Campbell
BY
ATTORNEY Patented Jan. 6, 1925.

1,521,751

UNITED STATES PATENT OFFICE.

ERNEST P. CAMPBELL, OF STOCKTON, CALIFORNIA.

CONNECTING-ROD CENTERING AND HOLDING DEVICE.

Application filed February 9, 1923. Serial No. 617,957.

*To all whom it may concern:*

Be it known that I, ERNEST P. CAMPBELL, a citizen of the United States, residing at Stockton, county of San Joaquin, State of California, have invented certain new and useful Improvements in Connecting-Rod Centering and Holding Devices; and I do declare the following to be a full, clear, and exact description of the same, reference being had to the accompanying drawings, and to the characters of reference marked thereon, which form a part of this application.

This invention relates to improvements in devices for use in connection with the boring or reaming out of rebabbitted connecting rods such as are commonly used in internal combustion engines of all kinds, the principal object of my invention being to provide a device by means of which the reaming tool may be centered in the crank or large end of the rod the correct distance from the wrist pin end of the rod before babbitting, and by means of which the rod, after being removed from the device, rebabbitted, and replaced, will then be located in the identical position with regard to the reaming tool that it first had.

This will insure that the center of the babbitt-bore, when machined, will be the correct distance from the center of bore for the wrist pin at the opposite end of the rod, it being essential for the correct operation of the engine of which the rod is a part, that the distance between said centers should remain exactly as originally set.

Another object is to provide a means for clamping the rod firmly against movement during the reaming operation, and for insuring that the axial lines of the rod-bores will be exactly parallel to each other, regardless of whether or not the sides of the rod, which are not machined and which are the parts of the rod necessarily clamped, are exactly at right angles to said axial lines or not.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views:

Fig. 1 is a top plan view of the complete apparatus, showing a rod in position and the reaming tool being centered with respect thereto.

Fig. 2 is a side view, detached, of the clamping member of the rod.

Fig. 3 is a fragmentary vertical section of the clamping member.

Fig. 4 is a fragmentary plan section of the same taken on the line 4—4 of Fig. 2.

Fig. 5 is a sectional view of a rod-bore centering member.

Fig. 6 is a fragmentary section of the clamping device taken on the line 6—6 of Fig. 2.

Referring now more particularly to the characters of reference on the drawings, the numeral 1 denotes a rigid base or table of suitable size, on one end of which is mounted a pair of spaced clamping members 2 in which are adapted to be removably clamped a device for receiving and centering the wrist-pin end 3 of a connecting rod 4.

This device comprises a pair of cylindrical members 5 and 6, the member 5 having a stem 7 slidably projecting through the member 6, the adjacent ends of said members being tapered or coned as shown at 8.

Slidably mounted on the base 1 for movement to and from the clamping members in a plane at right angles to the axial line of the centering device is a bearing block 9 in which is turnably and slidably mounted a shaft 10 adapted to carry a reaming or finishing tool at that end which projects over the base.

Slidably and removably mounted on the shaft 10 is another centering device, comprising a sleeve 11, threaded at its outer end and provided at its inner end with enlarged taper or cone portion 12, facing the threaded end and concentric with the shaft and sleeve. Slidably mounted on the sleeve is another symmetrical but opposed cone member 13, said members being adapted to impinge against the opposite edges of the unbabbitted crank-pin bore at the large end 14 of the connecting rod 4.

The movable cone is forced toward the fixed cone so as to snugly engage said rod-bore by a hand-nut 15 threaded onto the sleeve 11, spacers 16 being interposed on the sleeve between the cone 13 and the nut if necessary, which does away with the necessity of having a long threaded portion on the sleeve for narrow rod-ends, and at the same time enables the device to accommodate rod-ends of any width within reason.

The faces of the cones 12 and 13 are slotted to a certain depth at diametrally opposed points as shown at 17, for a purpose as will appear.

I have also provided means for holding the rod proper against lateral movement during the reaming operation, and for also preventing vertical movement of the rod which would cause the large bore to become eccentric with the boring shaft 10 when the centering device for the said bore is removed.

This means comprises a rigid and substantially U-shaped yoke 18, positioned in a vertical plane intermediate the shaft 10 and centering members 5 and 6, and preferably close to the former, the connecting rod proper passing between the sides of the yoke 18.

Said yoke is supported clear of the base 1 by means of a shank 19 projecting from one end thereof, which is slidably mounted and removably clamped in the bearing member 9 to one side of the shaft 10.

Mounted in the shank is a stem 20 having on its inner end a head 21 seated in a vertical slot 22 in the adjacent side of the yoke 18, the yoke being movable vertically relative to said head.

The shank and yoke are clamped together when the latter has been adjusted to any desired position by means of a clamping nut 23 on the outer end of the stem 20 and bearing against the adjacent end of the shank. Adjustment of the yoke itself is had by means of a screw 24 mounted against vertical movement in the block 18, and threaded through the head 21, said screw of course extending longitudinally of the line of movement of the yoke and the nub 23 being first loosened sufficiently to enable the screw 24 being turned without undue strain.

Pivoted at one side of the yoke on a horizontal pin 25 disposed at right angles to the shaft 19 is a block 26, projecting somewhat into the space between the sides of the yoke.

The pin 25 projects beyond the yoke-face on one end, and is threaded to receive a handle-screw 27 adapted to impinge against a plate 28 mounted between said screw and yoke-face, pins 29 being slidably seated in the yoke and extending between the plate and block 26 on each side of the pivot pin 25 and parallel thereto. It will therefore be seen that on turning down the screw 27, the pins will be forced into frictional engagement with the block 26 and will hold the same in any position it may have at the time.

Screwed through the opposite side of the yoke in alinement with the shank 19 is a screw 30, on the inner end of which facing the block 26, is a clamping head 31, mounted for limited universal movement on its screw.

An adjustable screw 32 is threaded through the bottom of the yoke and projects upwardly therebeyond, being positioned in a plane between the block 26 and head 31.

An arm 33 is pivoted on top of one side of the yoke, and is hooked on its opposite end to seat in a notch in the opposite side of the yoke.

The operation is as follows:

The rod to be rebabbitted is first cleaned of its old babbitt, and the small end 3 of the rod is placed between the centering cones 8, this being done by first separating the members 5 and 6.

The sleeve 11 is then slipped through the connecting-rod head 14 before the latter is lowered to the plane of the shaft 10, the cone 13 and nut 15 being of course placed on the sleeve after the latter is inserted through the head.

The rod, with the centering device, is then lowered so as to bring the sleeve 11 in line with the shaft 10, the latter being first retracted in its bearing so as to clear said sleeve, when it is then moved forward through the sleeve.

The rod proper 4 passes between the sides of the yoke and between the clamping members 26 and 31, the yoke 18 being adjusted vertically so as to bring the horizontal center line of the clamping members substantially centrally of the depth of the rod-section.

While the rod is being located the centering members 5 and 6, the shank 19 and the bearing block 9 are free, these members being then rigidly clamped in place when the rod is positively centered at both ends, which of course is done by causing both sets of centering cones to approach each other as closely as possible.

The shank 19 is also left free for longitudinal movement up to this time, and is now moved to bring the block 26 snugly against the adjacent side face of the rod, the block being swivelled permitting it to accommodate itself to any slight difference in vertical plane which may obtain between the upper and lower flanges of the rod-section.

The screw 27 is then turned down to cause the pins 29 to bite into the block 26 and hold it in the position it has thus been caused to assume.

The head 14 is made in two parts, with the customary shims 34 therebetween. Since these shims project inwardly of the bore of the head itself, or to the line of the babbitt bore, some provision is necessary to prevent the corners of these shims from contacting with the centering cones and destroying the accuracy of the centering operation. It is to take care of this that the grooves 17 are provided in the cones, said grooves being of sufficient depth and width to receive the projecting corners of the shims without touching the cones.

The rod now being accurately centered, the screw 32 is turned up to bear snugly against the lower face of the rod, as shown in Fig. 2.

The rod is then removed to be babbitted by retracting the shaft 10, raising the rod and removing the sleeve 11 and cones and then withdrawing the rod-end 3 from the cones 8, which is done by releasing and withdrawing only the member 5, which has the stem 7 thereon, the other clamp 2 and member 6 remaining undisturbed so as not to change the location of the same.

The head 14 is then babbitted in the usual manner, and the rod-end 3 then replaced between the cones 8, the rod being lowered till it rests on the previously adjusted screw 32, which insures that the head 14 will now be concentric with the boxing shaft 10 without further centering trials, the centering cones being no longer used.

The head 31 is then clamped snugly against the adjacent face of the rod so as to prevent spraining of the rod while the boring or reaming operation is in progress, a cutting tool being applied to the shaft 10 for this purpose, the latter being arranged to have both rotary and longitudinal movement. This feature itself however forms no part of my invention.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A connecting-rod holder and centering device comprising centering and supporting means for the wrist-pin end of the rod, means for centering the head end of the rod, a pivoted block adapted to be moved into engagement with the side-edges of one side of the rod, and to accommodate itself to the plane of said edges, and means for then clamping and holding said block in the position it has thus assumed irrespective and independently of the rod, whereby to provide a rigid backing for both side edges of the rod and prevent any possible lateral weaving of the rod.

2. A connecting-rod holder and centering device comprising centering and supporting means for the wrist-pin end of the rod, means for centering the head end of the rod, clamping means for the sides of the rod intermediate the ends thereof, a block in which said clamping means is mounted, and a spindle supporting the block; the spindle being adjustable in a plane parallel to the bores of the rod and the block being adjustable on the spindle in a plane at right angles to the axes of the bores.

3. A connecting-rod holder and centering device comprising centering and supporting means for the wrist-pin end of the rod, means for centering the head end of the rod, adjustable means for maintaining the centered relation of the head independently of the first named head centering means, independent adjustable means for clamping the sides of the rod, and a member in which both said last named means are mounted arranged for movement in planes both parallel to the rod-bores and at right angles thereto.

4. A connecting-rod holder and centering device comprising centering and supporting means for the wrist-pin end of the rod, means for centering the head end of the rod, adjustable means for maintaining the centered relation of the head independently of the first named head centering means, independent adjustable means for clamping the sides of the rod, and a member in which both said last named means are mounted arranged for movement in planes both parallel to the rod-bores and at right angles thereto, and a block in which said member and the first named head centering means are mounted, said block being movable lengthwise of the rod.

In testimony whereof I affix my signature.

ERNEST P. CAMPBELL.